United States Patent
Nava et al.

(10) Patent No.: US 9,593,595 B2
(45) Date of Patent: Mar. 14, 2017

(54) METHOD OF REMANUFACTURING A MACHINE COMPONENT

(71) Applicant: Solar Turbines Inc., San Diego, CA (US)

(72) Inventors: Irene Nava, San Diego, CA (US); Glenn R McClintic, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 389 days.

(21) Appl. No.: 14/251,804

(22) Filed: Apr. 14, 2014

(65) Prior Publication Data
US 2015/0292362 A1  Oct. 15, 2015

(51) Int. Cl.
F01D 25/24 (2006.01)
B23B 35/00 (2006.01)
B23P 6/00 (2006.01)

(52) U.S. Cl.
CPC .......... F01D 25/243 (2013.01); B23B 35/00 (2013.01); B23P 6/002 (2013.01); *B23B 2215/76* (2013.01)

(58) Field of Classification Search
CPC ... F01D 25/243; B23B 35/00; B23B 2215/76; B23P 6/002
USPC ......... 415/214.1; 29/402.01, 402.09, 402.14, 29/402.15
See application file for complete search history.

(56) References Cited

U.S. PATENT DOCUMENTS

| | | | | |
|---|---|---|---|---|
| 4,164,807 A | * | 8/1979 | King, Jr. .................. | B21J 15/02 29/523 |
| 4,984,347 A | * | 1/1991 | Cox .......................... | B23P 6/00 29/402.06 |
| 4,985,979 A | * | 1/1991 | Speakman ............... | B21J 15/02 29/512 |
| 5,651,172 A | * | 7/1997 | Auriol ..................... | B21J 15/02 29/512 |
| 6,370,752 B1 | | 4/2002 | Anderson et al. | |
| 6,751,841 B2 | * | 6/2004 | Schnabel ............... | B21J 15/043 29/524.1 |
| 8,230,569 B2 | | 7/2012 | Anantharaman et al. | |
| 8,516,676 B2 | | 8/2013 | High | |

(Continued)

FOREIGN PATENT DOCUMENTS

| | | |
|---|---|---|
| EP | 1775061 | 4/2007 |
| EP | 2208569 | 10/2011 |

(Continued)

*Primary Examiner* — Hoang Nguyen
(74) *Attorney, Agent, or Firm* — Procopio, Cory, Hargreaves & Savitch, LLP

(57) ABSTRACT

A method is provided for remanufacturing a machine component having multiple holes. The holes are provided to match in alignment with corresponding holes of an adjacent component in a machine assembly. First and second sets of holes are selected from the holes of the machine component on the basis of being located within first and second limits of positional tolerance with respect to corresponding holes of the adjacent component. Each hole from the first set of holes is bored to define openings in axial alignment with holes of the adjacent component. Each hole from the second set of holes is bored to an enlarged diameter and then plugged with a deformable insert. Each of these inserts is then drilled to define openings in axial alignment with holes of the adjacent component.

17 Claims, 12 Drawing Sheets

(56) References Cited

U.S. PATENT DOCUMENTS

2004/0107690 A1  6/2004  Poccia et al.
2014/0026999 A1  1/2014  Frailich et al.

FOREIGN PATENT DOCUMENTS

EP   1839802   12/2012
GB   2428396    1/2007

* cited by examiner

METHOD OF REMANUFACTURING A MACHINE COMPONENT

TECHNICAL FIELD

The present disclosure relates to a method of remanufacturing a machine component and more particularly to a method of remanufacturing a machine component having multiple holes that are to be matched with corresponding holes on an adjacent component of a machine assembly.

BACKGROUND

Manufacturers of machine components are continuously developing ways to re-use deformed machine components for fitment with associated machine assemblies. Accordingly, some methods have been developed in the past for configuring or re-configuring such deformed machine components.

For reference, U.S. Pat. No. 6,370,752 relates to a method for repositioning or repairing holes in metal substrates such as metal components used in jet engines and the like. The hole to be repositioned or repaired is enlarged and a recess is formed at each end of the enlarged hole. A deformable metal insert is inserted within the enlarged hole and then subjected to physical forces so as to cause it to deform and frictionally engage the walls of the recesses and the enlarged hole so that the insert becomes axially fixed therein. A new, repositioned hole can then be formed in the fixed insert that extends completely therethrough. However, such repositioning or repair of holes may not follow any pre-designed logic or strategy so as to accomplish the repair of holes in an optimal and/or efficient manner.

SUMMARY

In one aspect, the present disclosure provides a method for remanufacturing a machine component having multiple holes. The holes are to be matched with corresponding holes of an adjacent component in a machine assembly for co-axially receiving fasteners therein. The method includes selecting a first set of holes from the plurality of holes on the machine component. The method further includes boring each hole from the first set of holes to an enlarged diameter to define openings in axial alignment with holes of the adjacent component. The method further includes selecting a second set of holes from the plurality of holes on the machine component. The method further includes boring each hole from the second set of holes to an enlarged diameter. The method further includes plugging each of the bored second set of holes with a deformable insert. The method further includes drilling the inserts to define openings in axial alignment with holes of the adjacent component.

In another aspect, the present disclosure provides a method of configuring a deformed first flange for fitment onto a second flange, wherein the first flange defines holes that are axially offset from corresponding holes of the second flange. The method includes determining a first set of holes from the holes of the first flange that lie within a first limit of positional tolerance with respect to corresponding holes of the second flange.

The method further includes determining a second set of holes from the holes of the first flange that lie within a second limit of positional tolerance with respect to corresponding holes of the second flange. The method further includes boring the first and second sets of holes to an enlarged diameter. The bored first set of holes now axially align with corresponding holes of the second flange to receive fasteners therethrough. The method further includes plugging each of the bored second set of holes with a deformable insert. The method further includes drilling the inserts to define openings in axial alignment with corresponding holes of the second flange.

In yet another aspect, the present disclosure provides a method for remanufacturing a machine component having multiple holes. The holes are to be matched with corresponding holes of an adjacent component in a machine assembly for co-axially receiving fasteners therein. The method includes selecting a first hole from the plurality of holes on the machine component. The method further includes boring the first hole to an enlarged diameter to define an opening in axial alignment with a corresponding hole of the adjacent component.

The method further includes selecting a second hole from the plurality of holes on the machine component. The method further includes boring the second hole to an enlarged diameter. The method further includes plugging the bored second hole with a deformable insert. The method further includes drilling the insert to define an opening in axial alignment with a corresponding hole of the adjacent component.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular is also to be construed to relate to the plural and vice-versa without limiting the scope of the disclosure to the exact number or type of such elements unless set forth explicitly in the appended claims.

Figure 1:
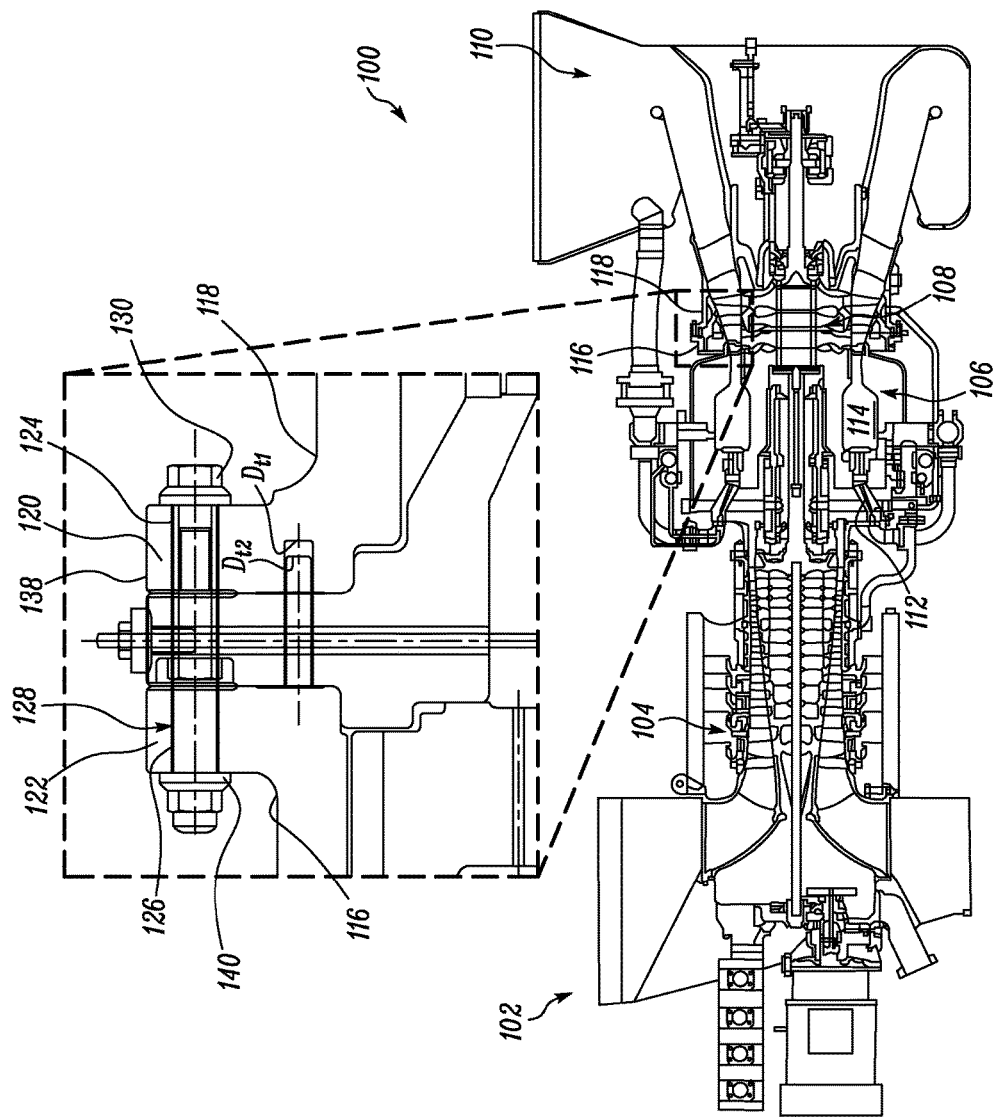
FIG. 1 is a side view of an exemplary gas turbine engine in accordance with an embodiment of the present disclosure.

FIG. 1 shows a side view of an exemplary gas turbine engine 100 in accordance with an embodiment of the present disclosure. However, in alternative embodiments, other types of engines known in the art may be suitably employed in lieu of the gas turbine engine 100 of FIG. 1. Some examples of engines that may be optionally used in place of the gas turbine engine 100 may include, but are not limited to, a reciprocating engine, a rotary engine or any other type of engine commonly known in the art.

Besides engines, the present disclosure may also be implemented in other structures typically used in various industrial applications. These structures may be static or dynamic structures depending upon the associated application. For example, the structures may be a pair of flanges that are mutually fastened to couple a pair of stationary or rotating members such as shafts. Therefore, although the present disclosure is explained in conjunction with the gas turbine engine 100, one of ordinary skill in the art will acknowledge that embodiments of the present disclosure can be similarly applied to or implemented with other suitable structures known in the art.

Referring to FIG. 1, the gas turbine engine 100 includes an inlet system 102, a compressor system 104, a combustor system 106, a turbine system 108, and an exhaust system 110. The inlet system 102 is configured to supply air to the compressor system 104. The compressor system 104 may compress the supplied air and operatively provide the compressed air to various components of the combustor system 106 and the turbine system 108, the compressed air also serving purposes in the gas turbine engine 100 such as, but not limited to, venting, and escaping through the exhaust system 110. The compressor system 104 may be, but not limited to, a rotary compressor. Further, the compressor system 104 may be a single stage or a multistage compressor. As shown in FIG. 1, the compressor system 104 may embody a multistage rotary compressor.

The combustor system 106 may include multiple injectors 112, and combustors 114 operatively connected to the injectors 112. The injectors 112 may be adapted to receive compressed air from the compressor system 104 and supply a mixture of fuel and air to the combustors 114. The combustors 114 combust the mixture of fuel and air to generate energy. This energy may be utilized to drive the turbine system 108 which may in turn use some part of the energy in driving the compressor system 104 while concurrently using the remaining part of the energy to do work.

Figure 2:
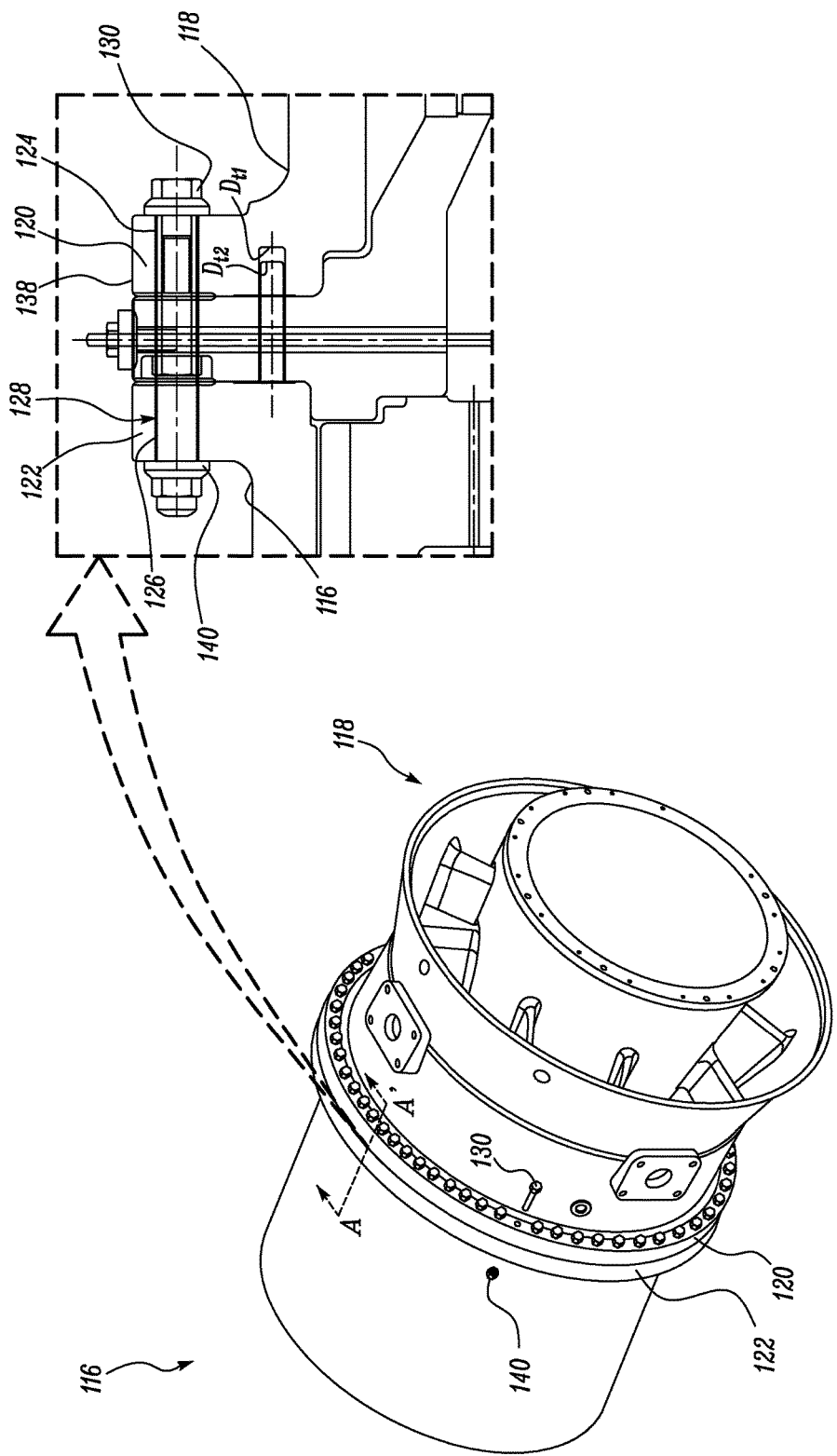
FIG. 2 is a perspective view of first and second flanges employed by the exemplary gas turbine engine of FIG. 1 showing matching hole patterns in a zoomed view taken along section A-A'.

The turbine system 108 and the exhaust system 110 may be coupled to each other. As shown in FIG. 1, the turbine system 108 and the exhaust system 110 define ends 116, 118 that are located proximal to each other. The end 118 of exhaust system 110 is shaped in the form of a flange 120. Similarly, the end 116 of the turbine system 108 is shaped into a flange 122 that is disposed in opposing relation with the flange 120. These flanges 120, 122 may include respective clocking or positional reference features $D_{r1}$, $D_{r2}$ that are configured to correspond in alignment with each other. The positional reference features $D_{r1}$, $D_{r2}$ may include for example, an interfitting pin and hole arrangement (as shown in FIG. 2), timing marks, or any other type of reference features that are required for the flanges 120, 122 to be in mutual alignment with each other.

For simplicity and ease in understanding the present disclosure, reference to the flanges 120, 122 of the exhaust system 110 and the turbine system 108 will be hereinafter made as the "first flange" and the "second flange" and designated with identical numerals 120 and 122 respectively.

The first flange 120 and the second flange 122 define co-axially aligned holes 124, 126 that are configured to receive fasteners 128 therein. The fasteners 128 mutually couple the first flange 120 and the second flange 122 in a releasable manner. As shown in FIG. 2, the fasteners 128 may be, for example, a bolt and nut arrangement. The bolt 130 is located away from a periphery 138 of the first and second flanges 120, 122. The bolt 130 may define a bolt head configured to abut the first flange 120 while the nut 140 may be engaged with a threaded shank of the bolt 130 and positioned in abutment with the second flange 122.

Although, the present disclosure is explained in conjunction with the bolt and nut arrangement, it may be noted that the bolt and nut arrangement is merely exemplary in nature and hence, non-limiting of this disclosure. Other suitable types of fasteners such as, but not limited to, rivets, grub screws, allen screws and the like may be alternatively employed in lieu of the bolt and nut arrangement disclosed herein.

FIG. 2 shows a perspective view of the first and second flanges 120, 122 with the matching hole pattern in a zoomed orthogonal view taken along section A-A'. Referring to FIG. 2, the holes 124, 126 on the first and second flanges 120, 122 are shown in axial alignment with each other. Moreover, the fasteners 128 are shown inserted in the axially aligned holes 124, 126 of the first and second flanges 120, 122.

However, referring to FIG. 1, the combustors 114 also generate exhaust gases that are routed into the exhaust system 110. These exhaust gases may be hot and are typically vented out with the help of the exhaust system 110. One of ordinary skill in the art will acknowledge that the first flange 120 and/or other associated system hardware present in the exhaust system 110 may be subject to high temperatures resulting from the heat of the exhaust gases. As a result, a size and/or shape of the first flange 120 may be prone to deformation. Moreover, holes 124 present on the first flange 120 may be displaced from their initial or nominal positions with respect to the corresponding holes 126 of the second flange 122, i.e., from co-axial positions with respect to the holes 126 of the second flange 122.

Figure 3:
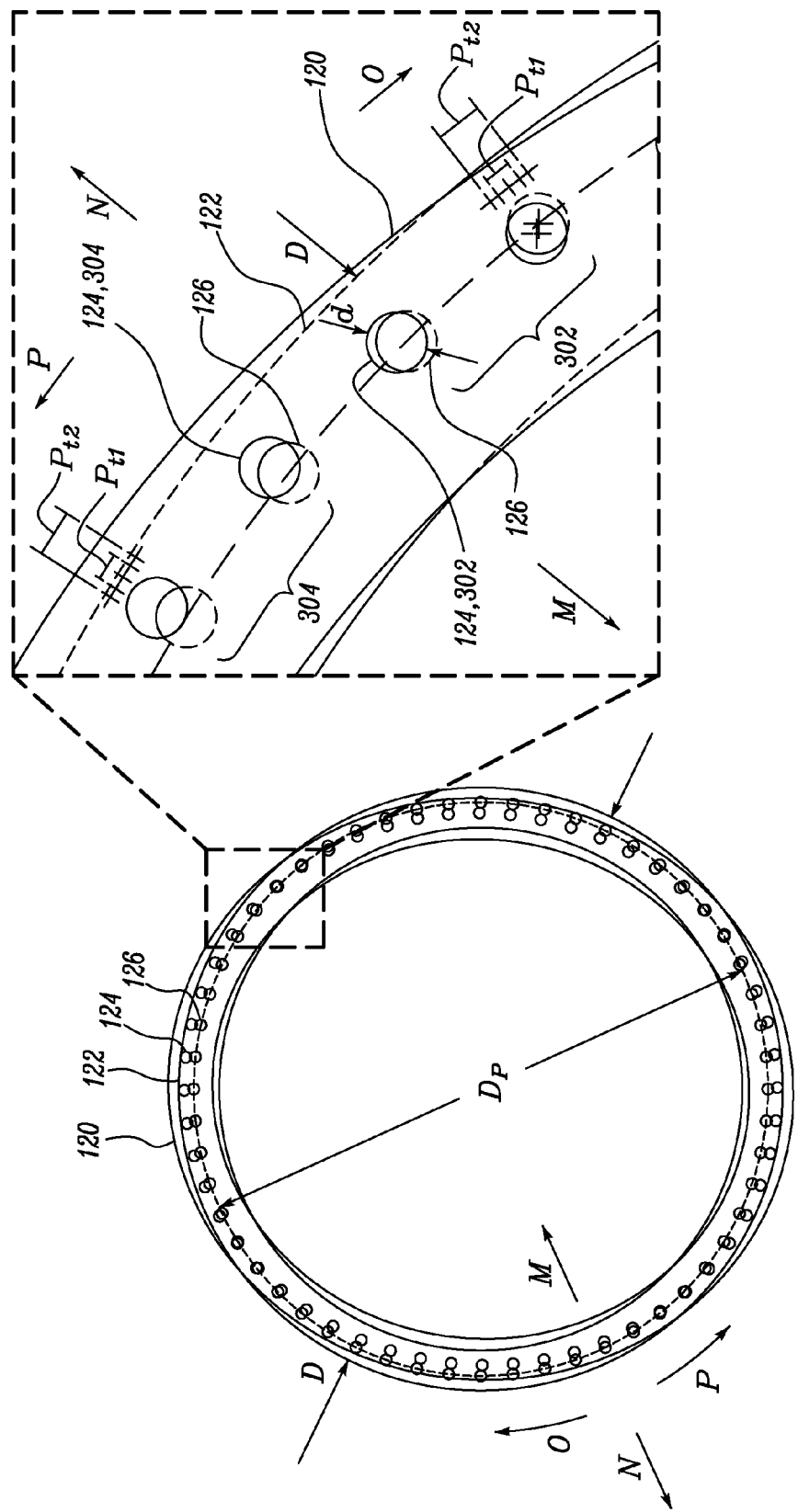
FIG. 3 is an exemplary front diagrammatic view of a deformed first flange in which embodiments of the present disclosure can be implemented.

Referring to FIG. 3, the first flange 120 is shown in an exemplary deformed state. As shown, a shape of the first flange 120 has undergone a change from an initial circular shape to an enlarged and/or oblong shape after a period of operation. One or more holes 124 of the first flange 120 are now axially offset with respect to the corresponding holes 126 of the second flange 122. As such, referring to FIG. 3, the holes 124 on the first flange 120 have been displaced to varying degrees from their co-axial positions with respect to the corresponding holes 126 on the second flange 122, as illustrated by the set of holes 302 and 304.

The holes 124 of the first flange 120 may be displaced in one or more of a radially inward direction i.e., towards a center of the first flange 120; a radially outward direction i.e., away from the center of the first flange 120; a clockwise direction; or a counter clockwise direction, as indicated by the respective arrows M, N, O, and P in FIG. 3.

The diagrammatic representation of FIG. 3 is exaggerated to bring out a contrast in the displacement of positions of the holes 124 and 126 on the respective flanges 120, 122 and thereby, improve the reader's clarity in understanding the present disclosure. One of ordinary skill in the art will acknowledge that the differences between the holes 124, 126 may be practically less or more than that depicted in FIG. 3 depending on actual conditions experienced by the flange 120. Therefore, it should be noted that the diagrammatic representation of FIG. 3 is merely illustrative in nature and hence, non-limiting of this disclosure.

Figure 4:
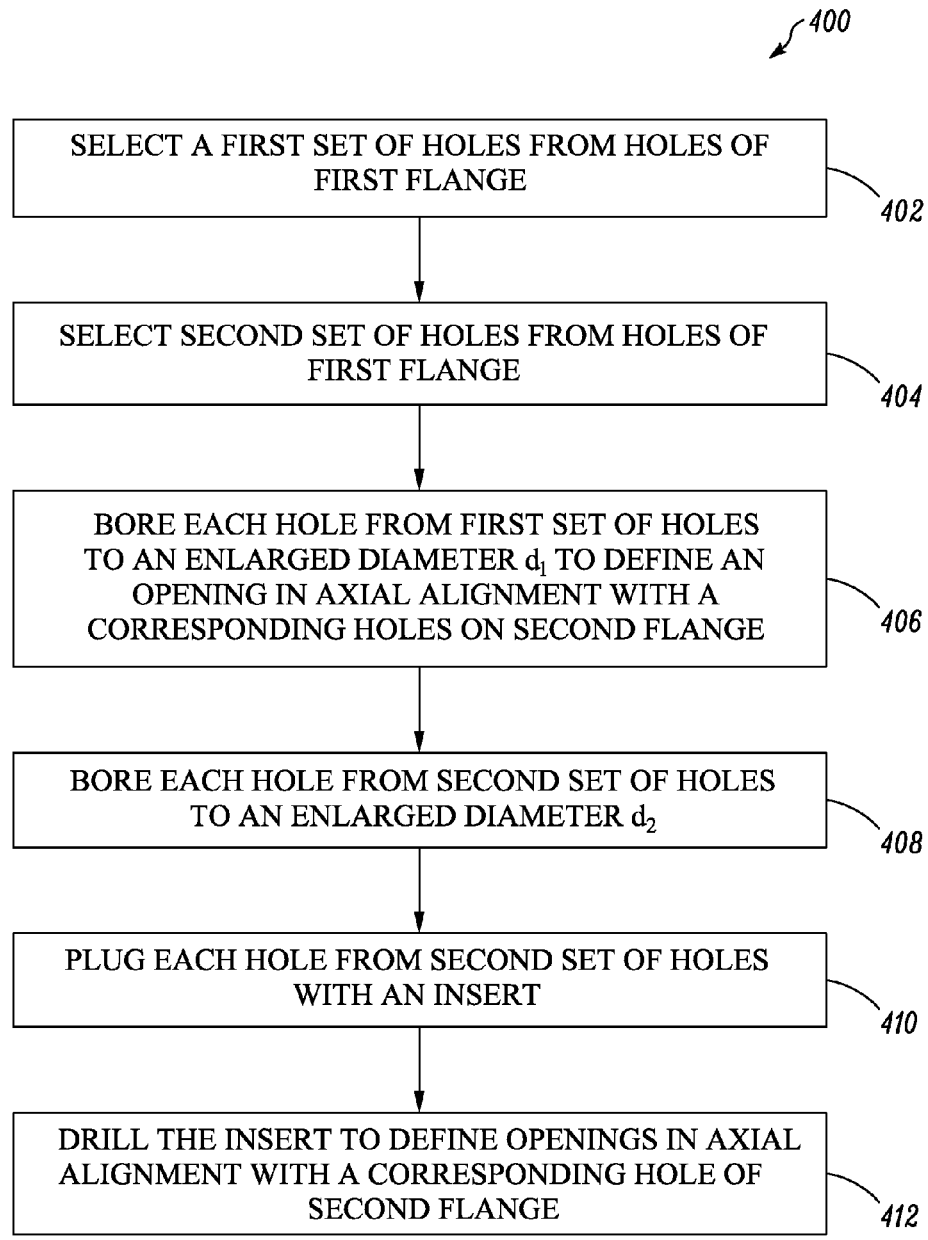
FIG. 4 is a method of remanufacturing the deformed first flange in accordance with an embodiment of the present disclosure.

The present disclosure relates to a method 400 (shown in FIG. 4) of configuring the deformed first flange 120 for fitment onto the second flange 122. Referring to FIG. 4, at step 402, the method 400 includes selecting a first set of holes 302 from the holes 124 on the first flange 120. The first set of holes 302 may be selected on the basis of a determination made regarding the amount of axial offset in the holes 124 of the first flange 120 relative to the corresponding holes 126 of the second flange 122. In an embodiment, the holes 124 of the first flange 120 that lie within a first limit of positional tolerance $P_{t1}$ with respect to the holes 126 of the second flange 122 may be regarded as the first set of holes 302.

The first limit of positional tolerance $P_{t1}$, disclosed herein, may be a pre-defined tolerance limit. The first limit $P_{t1}$ may be defined in relation to the clocking or positional reference feature $D_{t1}$. Moreover, the first limit $P_{t1}$ may be defined based on, but not limited to, a minimum permissible edge distance between the hole 124 and a periphery 138 of the first flange 120, a type of material forming the first flange 120, an amount of force and stress with which the first and second flanges 120, 122 are fastened, and other factors typically known to a person skilled in the art. As such, the force or torque with which the fasteners 128 secure the first and second flanges 120, 122 may in turn depend on variables having minimum permissible values. The variable may include, but is not limited to, bolt stretch, surface contact between the flange and the bolt, and/or pre-load of the bolt.

For example, referring to FIG. 3, if a nominal diameter D of the first flange 120 is 1270 millimeters (50 inches), a nominal diameter d of each hole 124 of the first flange 120 is 16.764 millimeters (0.660 inches), and a nominal pitch circle diameter $D_P$ consisting of centers of each hole 124 of the first flange 120 is 1193.8 millimeters (47 inches) so as to correspond with a similar arrangement and/or configuration of holes 126 on the second flange 122, then a value of the first limit of positional tolerance $P_{t1}$ may be set at ±0.1778 millimeters (±0.007 inches).

As illustrated in FIG. 3, the first limit of positional tolerance $P_{t1}$ may define the maximum amount of displacement or axial offset of a hole 124 from its nominal or initial position for it to be categorically classified into the first set of holes 302 disclosed herein. This first limit of positional tolerance $P_{t1}$ is applicable to the movement of a hole 124 in any direction/s i.e., radially inward direction M, radially outward direction N, clockwise direction O, and counter clockwise direction P. For example, if a hole 124 on the first flange 120 is displaced in the clockwise and radially outward direction i.e., P and N, to define an axial offset of 0.076 millimeters (0.003 inches) with its nominal position, then the hole 124 may be regarded as categorically falling within the first limit of positional tolerance $P_{t1}$ and hence, may be considered to form part of the first set of holes 302.

Referring again to FIG. 4, at step 404, the method 400 further includes selecting a second set of holes 304 from the holes 124 on the first flange 120. As with the first set of holes 302, the second set of holes 304 are also selected on the basis of a determination made regarding the amount of axial offset in the holes 124 of the first flange 120 relative to the corresponding holes 126 of the second flange 122. In an embodiment, if the holes 124 of the first flange 120 lie within a second limit of positional tolerance $P_{t2}$ with respect to the holes 126 of the second flange 122, then such holes 124 may be regarded as the second set of holes 304.

The second limit of positional tolerance $P_{t2}$ may be a pre-defined tolerance limit. As with the first limit of positional tolerance $P_{t1}$, the second limit $P_{t2}$ is also defined in relation to the clocking or positional reference feature $D_n$. Moreover, the second limit of positional tolerance $P_{t2}$ may be set to a value greater than the first limit of positional tolerance $P_{t1}$. The second limit of positioning tolerance $P_{t2}$ may be defined based on, but not limited to, a minimum permissible edge distance between the hole 124 and the periphery 138 of the first flange 120, a type of material forming the first flange 120, an amount of force and stress with which the first and second flanges 120, 122 are fastened, and other factors typically known to a person skilled in the art. As such, the force or torque with which the fasteners 128 may secure the first and second flanges 120, 122 in turn depend on variables having minimum permissible values such as, but not limited to, bolt stretch, surface contact, and/or pre-load of the bolt.

For example, referring to FIG. 3, if the nominal diameter D of the first flange 120 is 1270 millimeters (50 inches), the nominal diameter d of each hole 124 of the first flange 120 is 16.764 millimeters (0.660 inches), and the nominal pitch circle diameter $D_p$ on the first flange 120 is 1193.8 millimeters (47 inches), then the second limit of positional tolerance $P_{t2}$ may be set to a value of ±0.381 millimeters (±0.015 inches). Therefore, if a certain hole 124 of the first flange 120 has been displaced or axially offset, for example, by approximately 0.305 millimeters (approx. 0.012 inches), then the hole 124 is within the second limit of positional tolerance $P_{t2}$ and hence, categorically forms part of the second set of holes 304 of the present disclosure.

A person having ordinary skill in the art will acknowledge that the first and the second limits of positional tolerance $P_{t1}$, $P_{t2}$ disclosed herein are mutually exclusive of each other. The holes 124 may be displaced by a distance of between 0.001 to 0.4 times the nominal diameter d of the hole 124. In the preceding example, where $P_{t1}$ is ±0.178 millimeters (±0.007 inches), if a hole 124 on the first flange 120 is axially offset from its nominal position by, for example, 0.152 millimeters (0.006 inches), then such hole 124 may only be regarded as forming part of the first set of holes 302 alone although it is displaced by a distance that numerically lies within both the first and the second limits of positional tolerance $P_{t1}$, $P_{t2}$. Therefore, only if a hole 124 were displaced by a minimum of ±0.178 millimeters (±0.007 inches) or more (i.e., within a positional tolerance $P_{t2}$ of ±0.381 millimeters or ±0.015 inches) from its nominal position, then such hole 124 would be considered to form part of the second set of holes 304.

Figure 5:
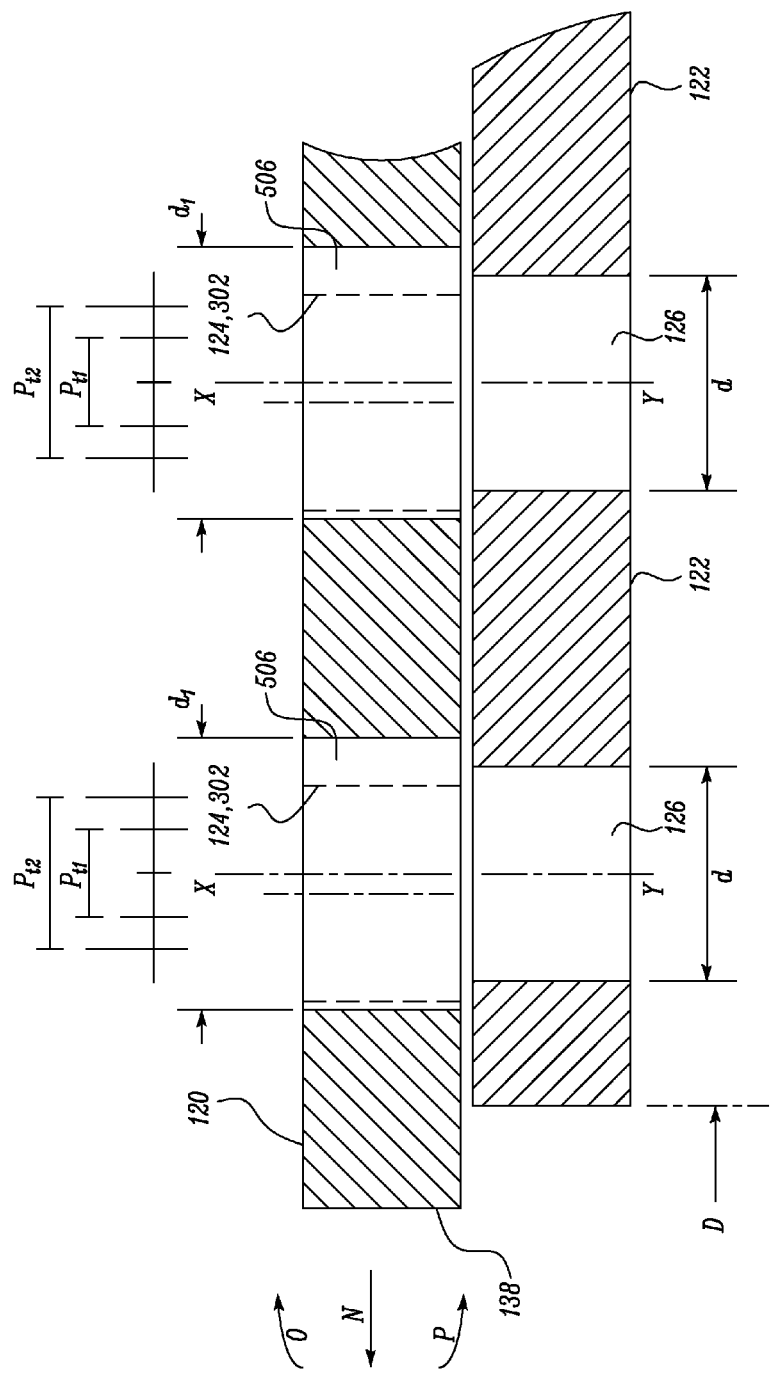
FIG. 5 is an exemplary side sectional view of the first and second flanges sectioned along a pitch circle diameter $D_P$ showing a first set of holes on the first flange, wherein the first set of holes are enlarged to define openings in axial alignment with corresponding holes of the second flange.

Referring back to FIG. 4, at step 406, the method 400 includes boring each hole 302 from the first set of holes 302 to an enlarged diameter $d_1$ to define openings 506 (shown in FIG. 5) in axial alignment with corresponding holes 126 of the second flange 122. Referring to FIG. 5, the hole 302 has been enlarged to define the opening 506 of diameter $d_1$ by performing a boring operation as known to one ordinarily skilled in the art.

It can be contemplated that an axis X used in boring the first set of holes 302 is kept axially aligned with respect to a centric axis Y of the corresponding holes 126 of the second flange 122. This way, each hole 302 from the first set of holes 302 can be bored to define an opening 506 that is re-positioned in alignment with corresponding holes 126 of the second flange 122. Therefore, the openings 506 of the first flange 120 are now axially aligned with the holes 126 of the second flange 122 and hence, may be configured to co-axially receive the fasteners 128 for e.g., the bolt 130 as shown in FIG. 1.

Figure 6:
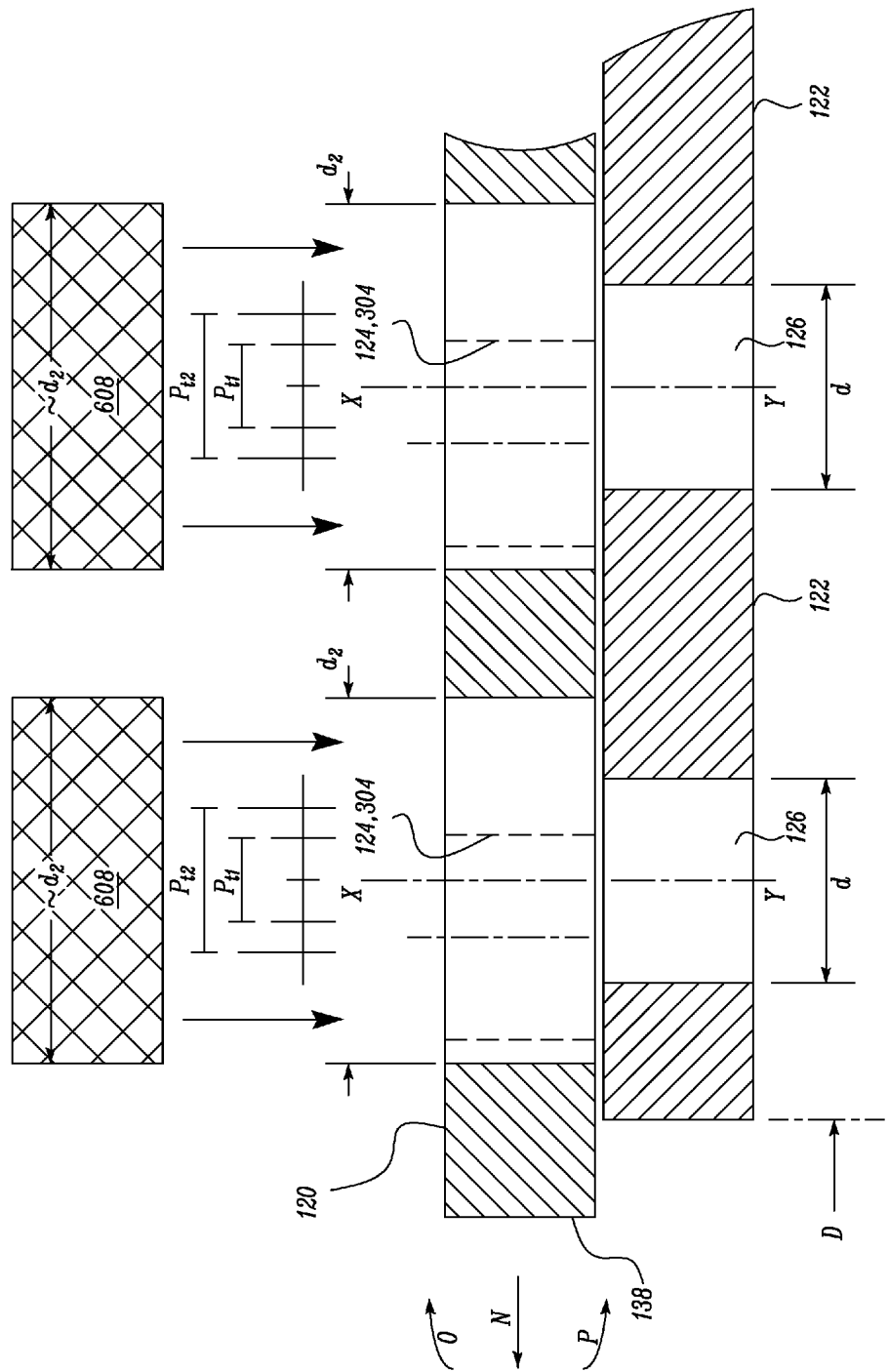
FIG. 6 is an exemplary side sectional view of the first and second flanges showing a second set of holes on the first flange, wherein the second set of holes are enlarged to receive deformable inserts therein.

Turning back to FIG. 4, at step 408, the method 400 further includes boring each hole 304 from the second set of holes 304 to an enlarged diameter $d_2$. As shown in FIG. 6, the diameter $d_2$ to which a hole 304 from the second set of holes 304 is enlarged may be different from the enlarged diameter $d_1$ disclosed for the first set of holes 302. Moreover, such enlargement of the second set of holes 304 may be performed keeping in mind the size of an insert 608 as will be explained later herein.

Referring to FIG. 4, at step 410, the method 400 further includes plugging each of the bored second set of holes 304 with a deformable insert 608. As shown in FIG. 6, the bored second set of holes 304 is plugged with deformable inserts 608. The deformable inserts 608 may be, for example, pre-fabricated metal blanks, torque inserts or any other type of structures that are commonly known in the art to fill holes, voids or spaces in a given material.

The inserts 608 may be press-fitted into the bored second set of holes 304. In one embodiment, the inserts 608 may be suitably sized to accomplish an interference fit or a transition fit with the bored second set of holes 304. Alternatively, the second set of holes 304 (See step 408 of FIG. 4, and FIG. 6) may be enlarged to a diameter $d_2$ depending on the type of fit required between the bored second set of holes 304 and the inserts 608.

It may be acknowledged by a person ordinarily skilled in the art that the enlargement of the first and second set of holes 302, 304 to the respective diameters $d_1$, $d_2$ may be performed keeping in mind the amount of flange material available around the first and second set of holes 302, 304 with the enlarged diameters $d_1$, $d_2$. Accordingly, a geometrical tolerance $G_t$ may be additionally applied when boring the first and second sets of holes 302, 304 to the respective diameters $d_1$, $d_2$.

The geometrical tolerance disclosed herein may dictate the minimum amount of flange material that is required to be present around the first and second set of holes 302, 304. As such, the geometrical tolerance $G_t$ may define the value of diameters $d_1$ and $d_2$ to which the first set of holes 302 and the second set of holes 304 may be enlarged respectively such that the flanges 120, 122 still continue to support the fasteners 128 or the inserts 608 adequately. Moreover, such geometrical tolerance $G_t$ may allow the flanges 120, 122 to support the loads resulting during operation with use of the fasteners 128 or the inserts 608.

The geometrical tolerance $G_t$ may be calculated based on many factors such as, but not limited to, a maximum permissible size of the hole 124 defined on the basis of the edge distance between the hole 124 and the periphery 138 of the first flange 120, and a minimum area of contact required between the flange material and the fasteners 128 i.e., the bolts 130 or the nuts 140. For example, as shown in FIG. 2, it is envisaged that in order to secure the flanges 120, 122 adequately, a minimum area of surface contact may be required between the flange 120 and an underside of the bolt head. Any area of contact below the minimum calculated value may be impermissible as per operational parameters, design and/or other constraints of the first flange 120. Additionally, such minimum area of surface contact between the flange 120 and the bolt head may be configured to support the amount of force with which the first and the second flanges 120, 122 are fastened.

Figure 7:
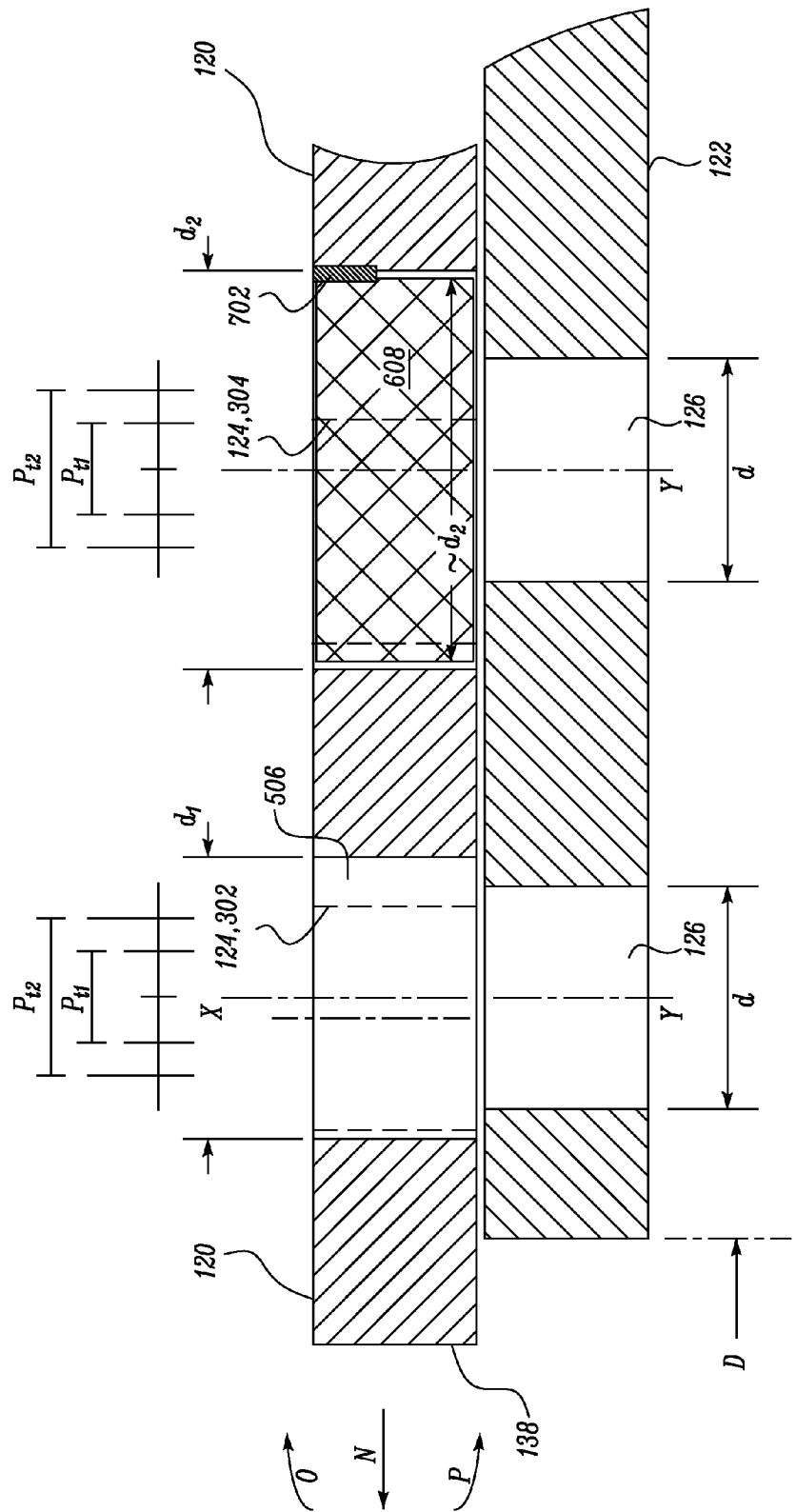
FIG. 7 is an exemplary side sectional view of the first and second flanges showing the aligned hole from the first set of holes from FIG. 6 and an enlarged hole from the second set of holes with a deformable insert positioned therein.

Moreover, as shown in FIG. 7, upon positioning the inserts 608 within the bored second set of holes 304, the inserts 608 may be secured to the flange material. Hence, the inserts 608 may be prevented from executing axial and/or rotational movement within the bored second set of holes 304. In an embodiment as shown in FIG. 7, locking pins 702 may be provided to assist in the securement of the insert 608 to the flange material. However, it is to be noted that the locking pins 702, disclosed herein, are merely exemplary in nature and hence, non-limiting of this disclosure.

Alternatively or additionally, the inserts 608 may be welded or stitched to the adjacent flange material. Therefore, it may be noted that various methods are readily available to one of ordinary skill in the art and such methods and/or techniques may be equally implemented for locking the deformable inserts 608 within the bored second set of holes 304 without deviating from the spirit of the present disclosure.

Figure 8:
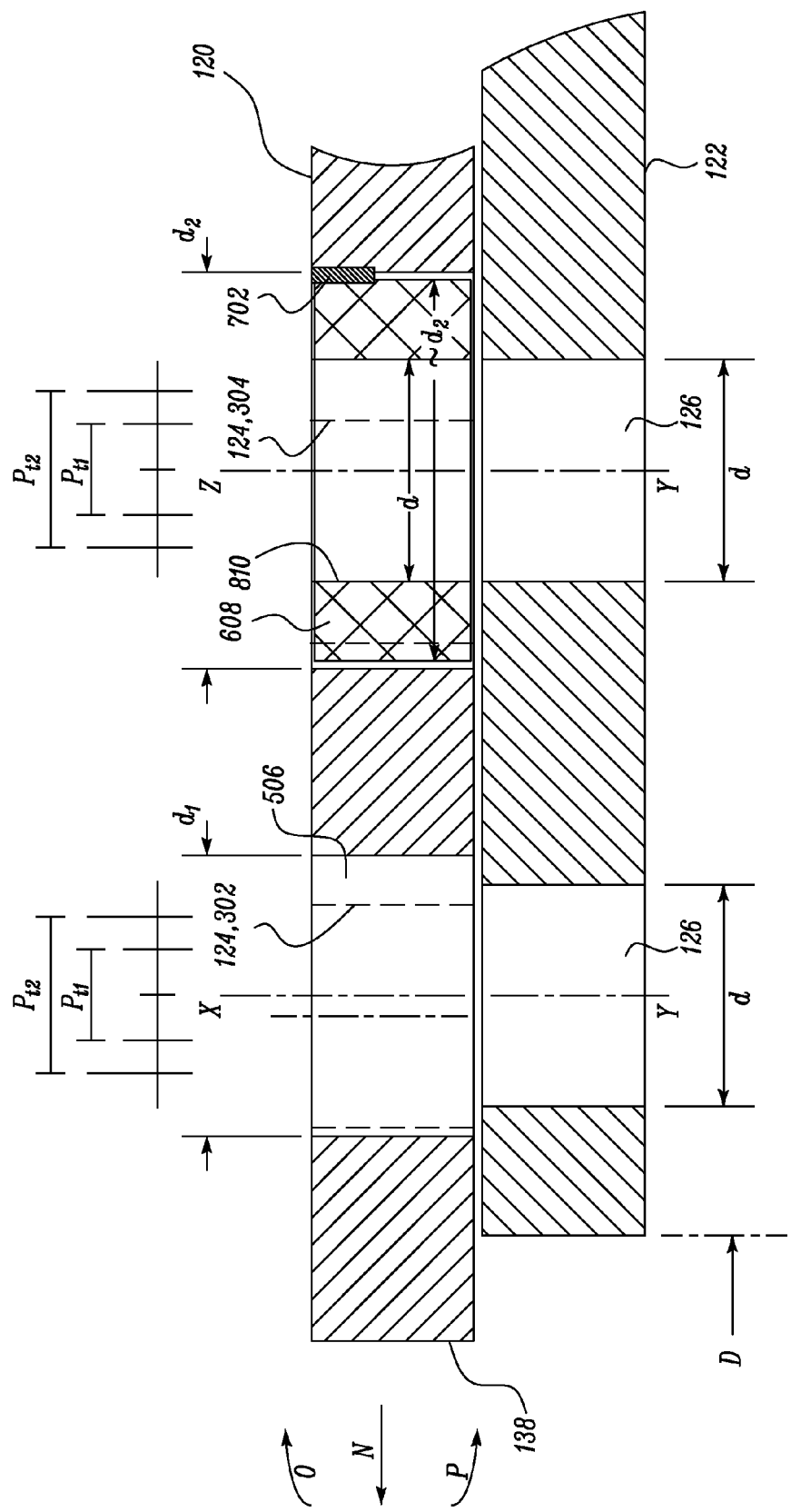
FIG. 8 is an exemplary side sectional view of the first and second flanges showing an opening defined in the insert of FIG. 7, wherein the opening is drilled in axial alignment with a centric axis of a corresponding hole on the second flange.

Referring to FIG. 4, at step 412, the method 400 further includes drilling the deformable inserts 608 to define openings 810 of FIG. 8 in axial alignment with the holes 126 of the second flange 122. An axis Z used in drilling the inserts 608 is aligned with a centric axis Y of the corresponding holes 126 on the second flange 122 so that openings 810 formed in the inserts 608 are axially aligned with the corresponding holes 126 of the second flange 122. Moreover, a size of a drill bit used in drilling the inserts 608 is selected as per the initial nominal diameters d of the holes 124 on the first flange 120.

Referring to FIG. 8, the openings 810 defined in the inserts 608 are shown in axial alignment with holes 126 of the second flange 122. Moreover, a size of the openings 810 corresponds to the nominal diameter d of the holes 124 on the first flange 120. In this manner, each hole 304 from the second set of holes 304 can be bored, plugged, and drilled in the insert 608 to define an opening 810 that is re-positioned in alignment with corresponding holes 126 of the second flange 122. Therefore, in this manner, the openings 506 from the first set of holes 302 and the openings 810 from the second set of holes 304 are now axially aligned with the holes 126 of the second flange 122 and hence, may be configured to co-axially receive the fasteners 128 therein.

It is to be noted that in various embodiments of the present disclosure, the axes X, Z of boring and/or drilling used for re-positioning the holes 124 of the first flange 120 are co-axially aligned with the centric axes Y of the holes 126 on the second flange 122. However, in alternative embodiments, it is contemplated to re-position the displaced holes 124 of the first flange 120 to positions as defined in an associated engineering drawing so that the resulting repositioned openings 506, 810 are matched in alignment with the holes 126 of the second flange 122.

Figure 9:
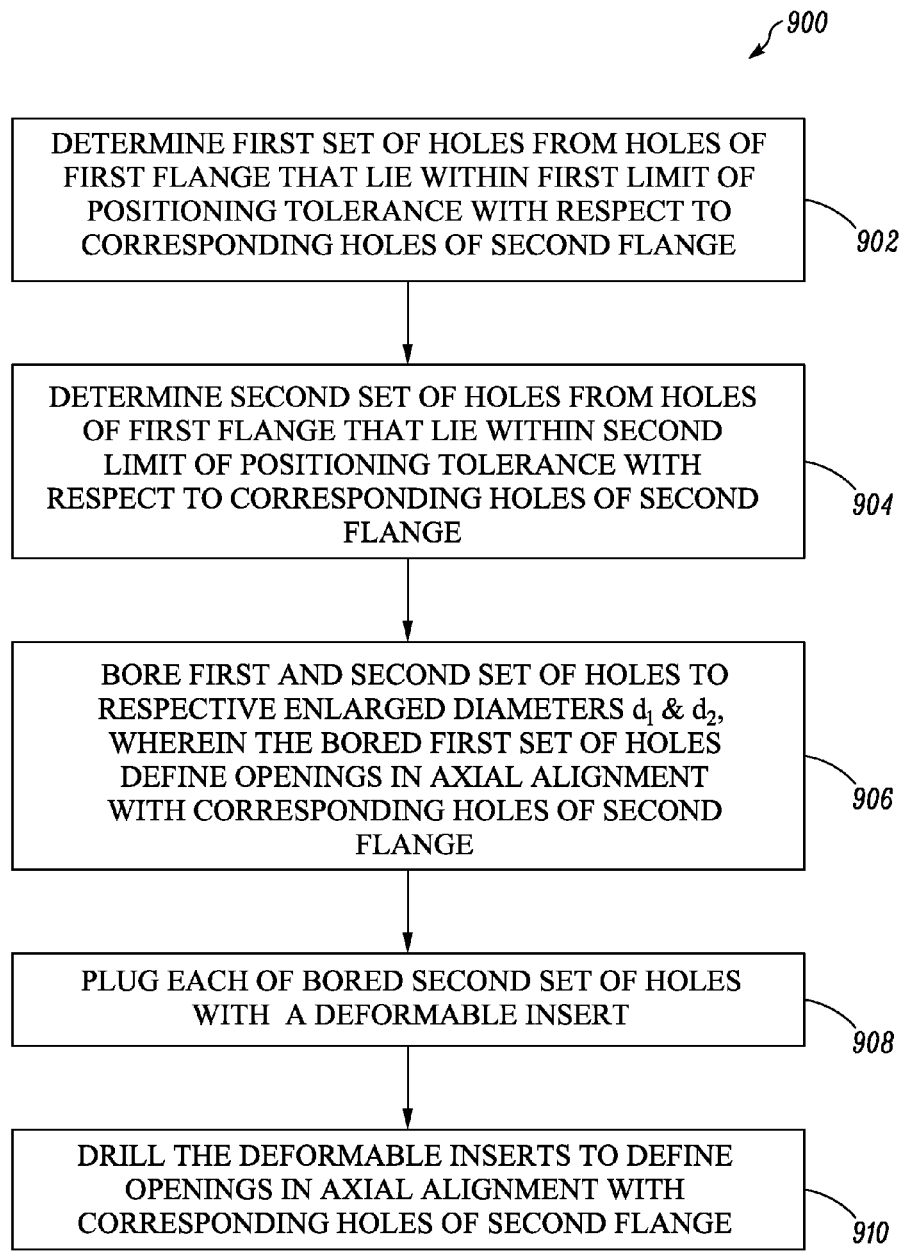
FIG. 9 is a method of configuring the deformed first flange for fitment onto the second flange of the exemplary gas turbine engine of FIG. 1, in accordance with another embodiment of the present disclosure.

FIG. 9 illustrates a method 900 of configuring the deformed first flange 120 for fitment onto the second flange 122 of the exemplary gas turbine engine 100 of FIG. 1 in accordance with another embodiment of the present disclosure. At step 902, the method 900 includes determining the first set of holes 302 from the holes 124 of the first flange 120 that lie within the first limit of positional tolerance $P_{t1}$ with respect to corresponding holes 126 of the second flange 122. At step 904, the method 900 further includes determining the second set of holes 304 from the holes 124 of the first flange 120 that lie within the second limit of positional tolerance $P_{t2}$ with respect to corresponding holes 126 of the second flange 122.

At step 906, the method 900 further includes boring the first and second set of holes 302, 304, to the respective enlarged diameters $d_1$, $d_2$. The enlarged diameter $d_1$ of the first set of holes 302 and the enlarged diameters $d_2$ of the second set of holes 304 may be similar or dissimilar depending on the sizes of the fasteners 128 and the inserts 608.

As disclosed earlier herein, in one embodiment, the first limit of positional tolerance $P_{t1}$ may be less than the second limit of positional tolerance $P_{t2}$. Boring the first set of holes 302 to the enlarged diameter $d_1$ disposes the bored first set of holes 302 in axial alignment with corresponding holes 126 of the second flange 122. The bored first set of holes 302 together with the corresponding holes 126 of the second flange 122 may then allow insertion of the fasteners 128 therethrough.

At step 908, the method 900 of FIG. 9 further includes plugging each of the bored second set of holes 304 with the deformable insert 608. At step 910, the method 900 further includes drilling the inserts 608 to define the openings 810 in axial alignment with corresponding holes 126 of the second flange 122. Thereafter, the openings 810 and the corresponding holes 126 are axially aligned and hence, may be configured to receive the fasteners 128 therethrough.

In an embodiment of the present disclosure, the second set of holes 304 may be selected on the basis of the holes 124 being located outside the first limit of positional tolerance $P_{t1}$ with respect to the corresponding holes 126 of the second flange 122. Therefore, in this embodiment, the second limit of positional tolerance $P_{t2}$ may not be present or used for the determination of the second set of holes 304 from the holes 124 on the first flange 120.

Figure 10:
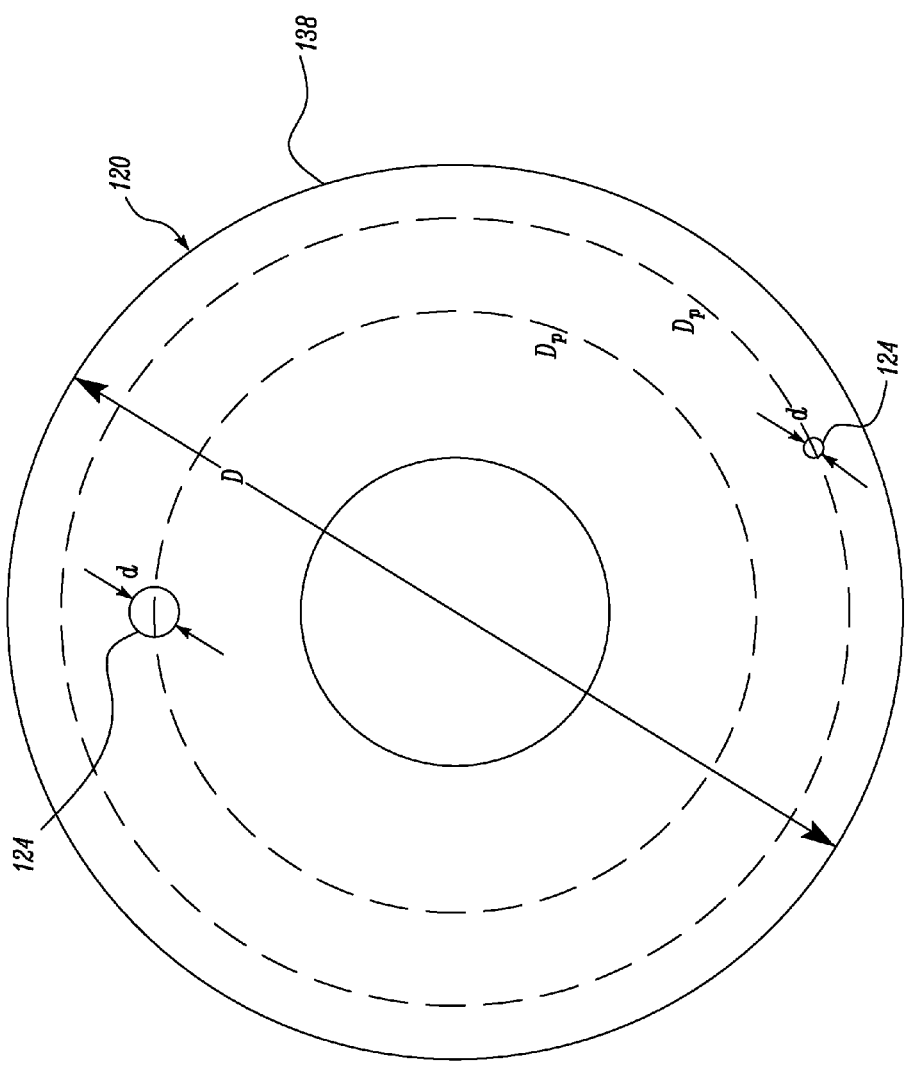
FIG. 10 is front view of an exemplary flange having holes that can have a large limit of positional tolerance applicable thereto.

In an example as shown in FIG. 10, if a hole 124 is located substantially far from the periphery 138, or from adjacent holes 124 of the first flange 120, then a very large value in the second limit of positional tolerance $P_{t2}$ may be permitted in the displacement of such hole 124. Also, in another example as shown in FIG. 10, if a nominal diameter d of a hole 124 on the flange is significantly smaller than the diameter D of the flange itself, then a large value of second limit $P_{t2}$ may be applicable to such hole 124. As such, the holes 124 of the first flange 120 may be displaced to a distance of between 0.001 to 0.4 times of their respective diameters d. Therefore, even if the hole 124 may be located close to the periphery 138 of the flange, the significantly small diameter d of the hole 124 may result in a large value of the second limit of positional tolerance $P_{t2}$.

Referring to FIG. 10, if a nominal position of the holes 124 is far away from the periphery 138 of the first flange 120, or if the diameters d of the holes 124 are negligible in comparison with the diameter D of the first flange 120, then the second limit of positional tolerance $P_{t2}$ may be practically large in value. Therefore, one of ordinary skill in the art may acknowledge that it is possible to omit a large second limit of positional tolerance $P_{t2}$ when determining the second set of holes 304 from the holes 124 of the first flange 120.

In such cases, the first limit $P_{t1}$ alone may be used in the determination of the first set of holes 302 and the second set of holes 304 as well. If the holes 124 of the first flange 120 are displaced or axially offset to a distance within the first limit of positional tolerance $P_{t1}$, then such holes 124 may be regarded as the first set of holes 302. If the holes 124 are displaced outside of the first limit of positional tolerance $P_{t1}$, then such holes 124 may be regarded as the second set of holes 304. Accordingly, the first set of holes 302 may be simply bored to the enlarged diameter $d_1$ and re-positioned in axial alignment with corresponding holes 126 of the second flange 122. The second set of holes 304 may be bored, plugged with inserts 608, and drilled in the inserts 608 to define the openings 810 in axial alignment with the corresponding holes 126 of the second flange 122.

Therefore, depending on relative diameters d, D and positions of the first flange 120 and the holes 124 therein, the first limit $P_{t1}$ alone, or both the first and second limits of positional tolerance $P_{t1}$, $P_{t2}$ may be used to determine the first and second sets of holes 302, 304 from the holes 124 of the first flange 120. Moreover, the relative diameters d, D of the holes 124 and the first flange 120 forms the basis for the geometrical tolerance $G_t$ disclosed herein while the relative positions of the first flange 120 and the holes 124 form the basis for the first and second limits of the positioning tolerance $P_{t1}$, $P_{t2}$. Hence, one of ordinary skill in the art may acknowledge that although the second limit $P_{t2}$ is disclosed herein, in cases of smaller sized holes 124, or holes 124 that are located far away from the periphery 138 of the first flange 120, the first and second sets of holes 302, 304 may be determined using the first limit of positional tolerance $P_{t1}$ alone.

Moreover, although the first and second sets of holes 302, 304 disclosed herein are pursuant to a matching pattern or arrangement of the holes 124, 126 on the first and second flanges 120, 122, the present disclosure is also applicable when one hole alone is displaced from its nominal position. Based upon its magnitude of displacement or axial offset, the hole 124 may be categorically classified as falling within the first limit of positional tolerance $P_{t1}$ or within the second limit of positional tolerance $P_{t2}$. Optionally, in case of using the first limit of positional tolerance $P_{t1}$ alone, such hole 124 may be classified as falling within or outside of the first limit of positional tolerance $P_{t1}$. Thereafter, embodiments of the present disclosure may be implemented to reposition the hole 124 and match such hole 124 in alignment with the corresponding hole 126 of the second flange 122.

Further, it may be noted that although the present disclosure is explained in conjunction with the first and second flanges 120, 122 of the gas turbine engine 100, the first and second flanges 120, 122 are merely exemplary in nature and non-limiting of this disclosure. The present disclosure may equally be applied to remanufacture various other types of machine components in a machine assembly in which holes of such machine components have to be matched in alignment to receive the fasteners 128.

Figure 11:
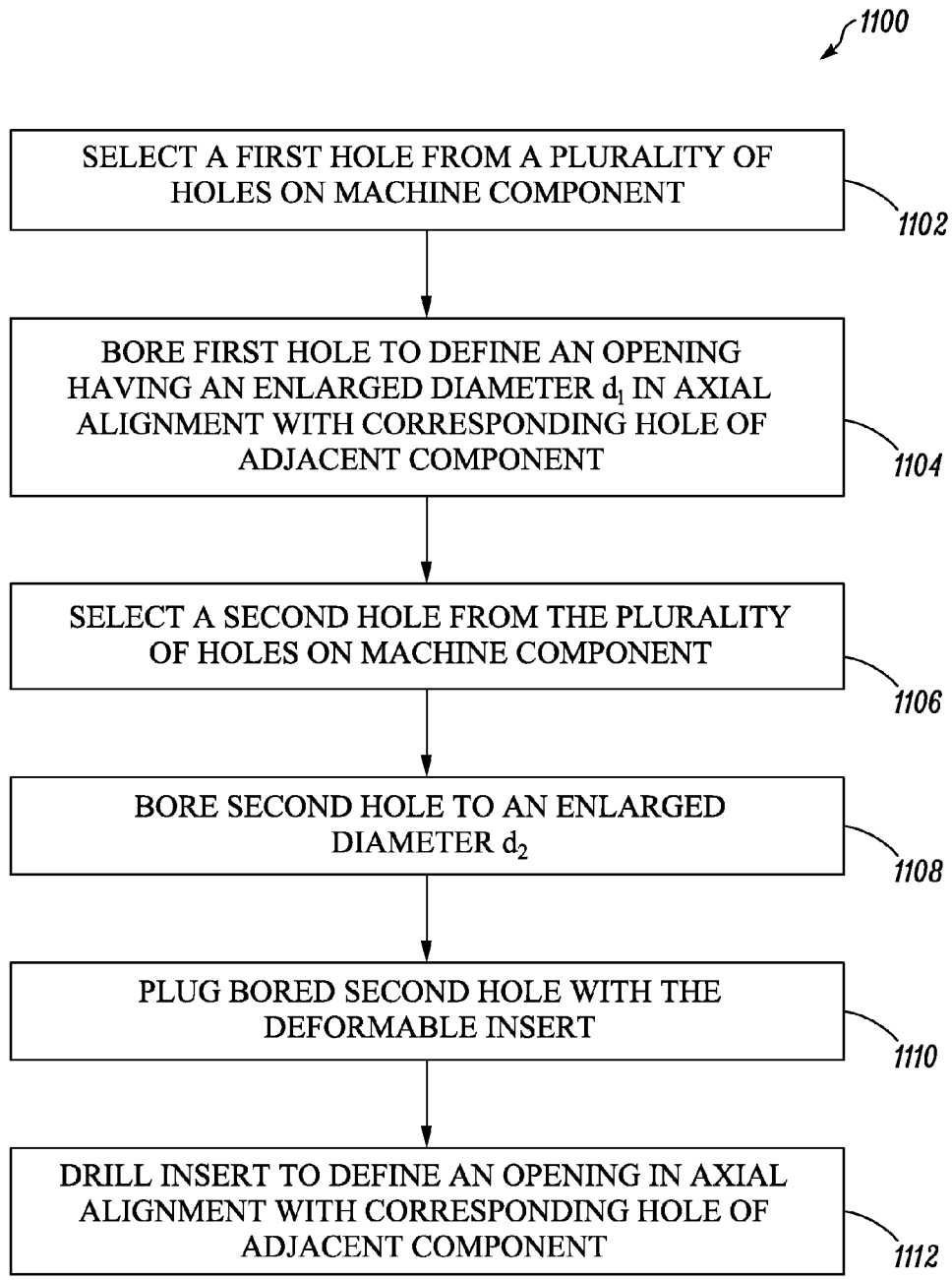
FIG. 11 is a method of remanufacturing a machine component in accordance with another embodiment of the present disclosure.
Figure 12:
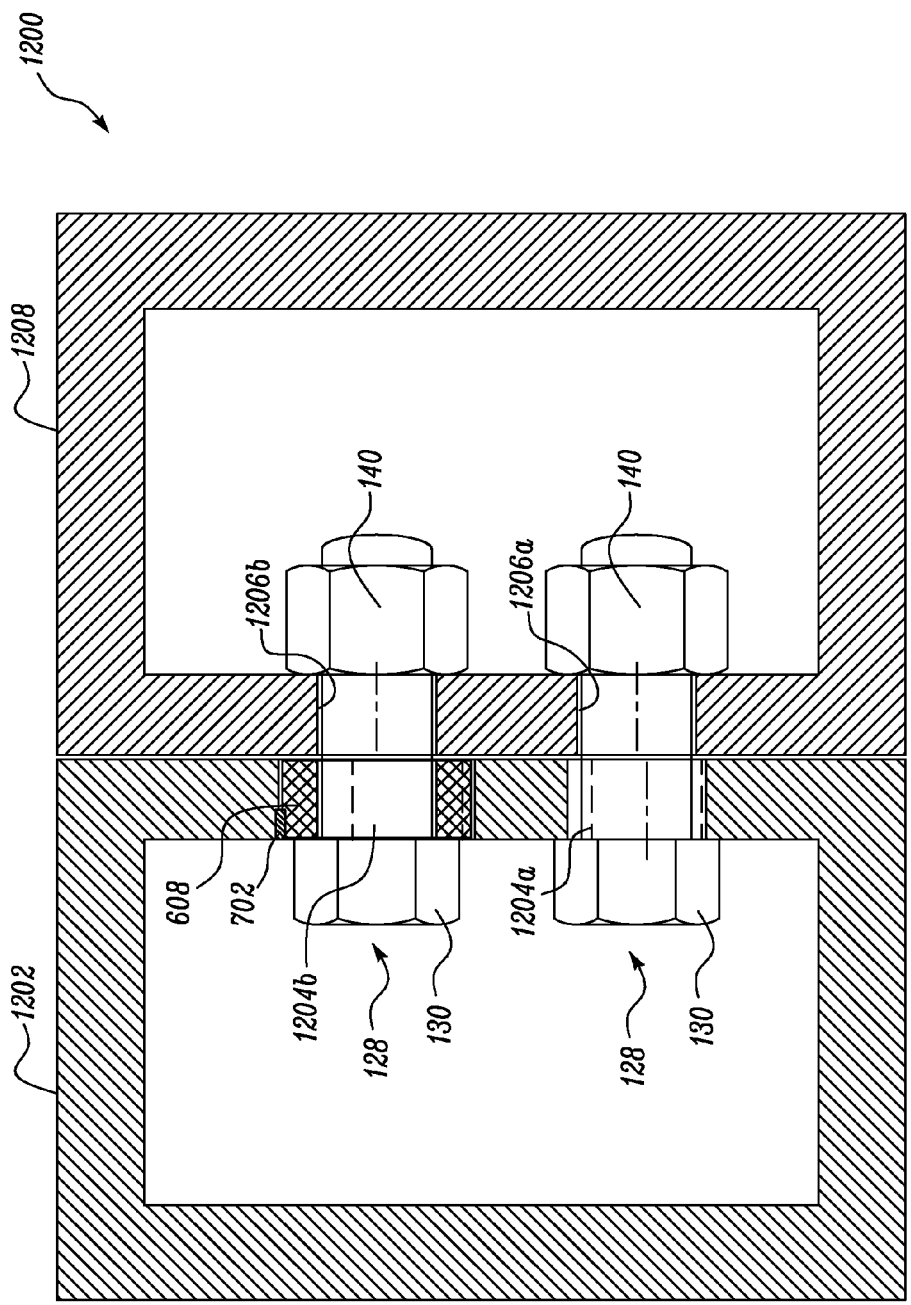
FIG. 12 is an exemplary machine assembly having machine components that are remanufactured using the method of FIG. 11.

FIG. 11 illustrates a method 1100 of remanufacturing a machine component 1202 (shown in FIG. 12) having multiple holes 1204 that are to be matched with corresponding holes 1206 of an adjacent machine component 1208 in a machine assembly 1200. Referring to FIG. 12, exemplary machine components 1202 of the exemplary machine assembly 1200 are shown remanufactured using the method 1100 of FIG. 11. The machine components 1202 and 1208 are configured for fitment into each other to form an exemplary machine assembly 1200. As shown, the machine components 1202, 1208 are in the shape of hollow boxes that are assembled to form a single large rectangular-shaped machine assembly 1200.

Each of the machine components 1202, 1208 is shown including two holes 1204a, 1204b, one of which may have been within the first limit of positioning tolerance $P_{t1}$, and the other of the holes 1204a, 1204b may have been outside of the first limit of positioning tolerance $P_{t1}$. To that effect, each of the holes 1204a, 1204b has been shown re-positioned using the method 1100 of FIG. 11 such that the individual hollow boxes are configured for fitment with each other in order to make up the box assembly.

Referring to FIG. 11, at step 1102, the method 1100 includes selecting a first hole 1204a from the holes 1204 on the machine component 1202. The first hole 1204a may be categorically selected based on its current position falling within the first limit of positioning tolerance $P_{t1}$ with respect to its nominal position.

At step 1104, the method 1100 further includes boring the first hole 1204a to an enlarged diameter $d_1$ to define an opening 1212 in axial alignment with a corresponding hole 1206 of the adjacent component 1208.

At step 1106, the method 1100 further includes selecting a second hole 1204b from the holes 1204 on the machine component 1202. At step 1108, the method 1100 further includes boring the second hole 1204b to an enlarged diameter $d_2$. At step 1110, the method 1100 further includes plugging the bored second hole 1204b with a deformable insert 1214. Further, at step 1112, the method 1100 further includes drilling the insert 1214 to define an opening 1216 in axial alignment with a corresponding hole 1206 of the adjacent component 1208.

Various embodiments disclosed herein are to be taken in the illustrative and explanatory sense, and should in no way be construed as limiting of the present disclosure. All directional references (e.g., inward, outward, radial, upper, lower, upward, downward, left, right, leftward, rightward, top, bottom, above, below, vertical, horizontal, clockwise, and counter-clockwise) are only used for identification purposes to aid the reader's understanding of the present disclosure, and may not create limitations, particularly as to the position, orientation, or use of the devices and/or methods disclosed herein. Joinder references (e.g., attached, affixed, coupled, connected, and the like) are to be construed broadly. Moreover, such joinder references do not necessarily infer that two elements are directly connected to each other.

Additionally, all numerical terms, such as, but not limited to, "first", "second", "third", or any other ordinary and/or numerical terms, should also be taken only as identifiers, to assist the reader's understanding of the various embodiments, variations and/or modifications of the present disclosure, and may not create any limitations, particularly as to the order, or preference, of any embodiment, variation and/or modification relative to, or over, another embodiment, variation and/or modification.

In methodologies directly or indirectly set forth herein, various steps and operations are described in one possible order of operation, but those skilled in the art will recognize that steps and operations may be rearranged, replaced, or eliminated without departing from the spirit and scope of the present disclosure as set forth in the claims.

It is to be understood that individual features shown or described for one embodiment may be combined with individual features shown or described for another embodiment. It is to be understood some features are shown or described to illustrate the use of the present disclosure in the context of functional segments and such features may be omitted within the scope of the present disclosure and without departing from the spirit of the present disclosure as defined in the appended claims.

INDUSTRIAL APPLICABILITY

The methods 400, 900, 1100 of the present disclosure have applicability for implementation and use in remanufacturing of various machine components such that the remanufactured machine components are configured for fitment with each other.

In some cases, manufacturers may encounter parts or components of a machine assembly that are adjacently located but with holes that may not necessarily match in alignment with each other. In other cases, although manufacturers initially configure the holes in alignment with each other, the machine components may undergo deformation after a certain period of operation thereby displacing the holes defined therein. As a result, the holes may move from their nominal positions and subject the fasteners to shear stress or fracture. It may be cumbersome to mutually align the holes of adjacent machine components by repairing a shape of the deformed flange. Moreover, such repair may be tedious, expensive, and time consuming to the manufacturer.

As an alternative solution, manufacturers may consider scrapping the deformed parts and may manufacture new parts or components altogether so that a fit, form, and function of such new parts or components may adhere to pre-defined engineering drawings and/or standards. However, manufacture of new parts may entail extensive labour, time, and effort thus decreasing overall profits to the manufacturer.

The methods 400, 900, 1100 of the present disclosure assist manufacturers in salvaging the deformed components by remanufacturing them in a simple and cost-effective manner. The methods 400, 900, 1100 disclosed herein allow manufacturers to repair the flange 120 by repositioning the holes 124 therein, without affecting or changing the initial alignment of the flanges 120, 122 defined by their respective clocking or positional reference features $D_{r1}$, $D_{r2}$. Referring to FIGS. 3 and 12, if holes 124, 1204a, 1204b on a particular component 120, 1202 are to be matched in alignment with holes 126, 1206a, 1206b on an adjacent component 122, 1208, an extent of the axial offset between the holes 124, 1204a, 1204b and the corresponding holes 126, 1206a, 1206b is determined. The holes 124, 1204a are then classified as the first set of holes 302 or the second set of holes 304 depending upon the extent of axial offset from its respective nominal positions. The nominal positions disclosed herein are positions of the holes 124, 1204a such that their respective centres co-axially align with centric axes Y of corresponding holes 126, 1206a, and 1206b on the adjacent component 122, 1208.

As hole 124, 1204a falls within the first limit of positioning tolerance $P_{t1}$, such hole 124, 1204a may be merely bored to define the opening 506 having diameter $d_1$ such that the associated centre of such opening 506 is now re-positioned in axial alignment with the centric axis Y of the corresponding hole 126, 1206a on the adjacent machine component 122, 1208.

As hole 124, 1204b falls within the second limit of positioning tolerance $P_{t2}$, then such hole 124, 1204b may be bored to an enlarged diameter $d_2$, plugged with an insert 608, and then drilled in the insert 608 to define the opening 810 in axial alignment with the centric axis Y of the corresponding hole 126, 1206 on the adjacent machine component.

However, when boring the displaced first and second set of holes 302, 304 to the diameters $d_1$, $d_2$, the diameters $d_1$, $d_2$ may be configured to lie within the permissible geometrical tolerances $G_t$. For example, referring to FIG. 5, although the openings 506 now align with the corresponding holes 126 on the second flange 122, the openings 506 would not be sized so large as to cause them to close in or merge with the periphery 138 of the first flange 120. Meanwhile, the openings 506 would also not be sized so large as to cause insufficient contact area of the flange material with the fasteners 128, i.e., bolts 130 or nuts 140, for example, with the underside of the bolt head as depicted in FIG. 1. Therefore, the methods 400, 900, 1100 disclosed herein take into account the positional tolerance and the geometrical tolerance $G_t$ of the holes 124, 1204a on a given machine component 120, 1202 when remanufacturing such machine component 120, 1202.

With implementation of the present methods, machine components may be remanufactured for mutual fitment in a simple and cost-effective manner. Moreover, a manufacturer may save significant time that is typically required in manufacturing a fresh or new component. Further, manufacturers may offset costs that were previously incurred with use of conventionally known methods or techniques. Furthermore, use of the methods disclosed herein may allow manufacturers to reduce carbon footprint as a result of salvaging the deformed machine components.

While aspects of the present disclosure have been particularly shown and described with reference to the embodiments above, it will be understood that various additional embodiments may be contemplated by the modification of the disclosed machine, systems and methods without departing from the spirit and scope of what is disclosed. Such embodiments should be understood to fall within the scope of the present disclosure as determined based upon the claims and any equivalents thereof.

We claim:

1. A method of remanufacturing a machine component having a plurality of holes, wherein the holes are to be matched with corresponding holes of an adjacent component in a machine assembly for co-axially receiving fasteners therein, the method of remanufacturing comprising:
   selecting a first set of holes from the plurality of holes on the machine component that lie within a first limit of positional tolerance with respect to a first portion of the corresponding holes of the adjacent component;
   boring each hole from the first set of holes to a first enlarged diameter to define openings in axial alignment with the first portion of the corresponding holes of the adjacent component;
   selecting a second set of holes from the plurality of holes on the machine component that lie outside the first limit of positional tolerance with respect to a second portion of the corresponding holes of the adjacent component;
   boring each hole from the second set of holes to a second enlarged diameter;
   plugging each of the bored second set of holes with a deformable insert; and
   drilling the inserts to define openings in axial alignment with the second portion of the corresponding holes of the adjacent component.

2. The method of claim 1, wherein selecting the first set of holes and selecting the second set of holes includes selecting holes positioned at an axial offset from corresponding holes of the adjacent component.

3. The method of claim 1, wherein the second set of holes are selected on the basis of the holes being located within a second limit of positional tolerance with respect to corresponding holes of the adjacent component.

4. The method of claim 3, wherein the first limit is lesser than the second limit.

5. The method of claim 1, wherein selecting the second set of holes includes selecting holes having a diameter greater than a diameter of the corresponding holes on the adjacent component.

6. The method of claim 1, wherein an axis of drilling the inserts is co-axial to a centric axis of corresponding holes of the adjacent component.

7. A flange remanufactured using the method of claim 1.

8. The flange of claim 7, wherein the flange forms part of an exhaust diffuser of a gas turbine engine.

9. A method of configuring a deformed first flange for fitment onto a second flange, wherein the first flange comprises holes axially offset from corresponding holes of the second flange, the method comprising:
   determining a first set of holes from the holes of the first flange that lie within a first limit of positional tolerance with respect to the corresponding holes of the second flange;
   determining a second set of holes from the holes of the first flange that lie within a second limit of positional tolerance with respect to the corresponding holes of the second flange;
   boring the first set of holes and the second set of holes to enlarged diameters to form a bored first set of holes and a bored second set of holes, wherein the bored first set of holes are disposed in axial alignment with the corresponding holes of the second flange to receive fasteners therethrough;
   plugging each of the bored second set of holes with a deformable insert; and
   drilling the deformable inserts to define openings in axial alignment with the corresponding holes of the second flange.

10. The method of claim 9, wherein determining the second set of holes includes determines holes having a diameter greater than a diameter of the corresponding holes on the second flange.

11. The method of claim 9, wherein an axis of drilling the inserts is co-axial to a centric axis of the corresponding holes of the adjacent component.

12. The method of claim 9, wherein the first limit of positional tolerance and the second limit of positional tolerance are pre-defined tolerance limits.

13. The method of claim 9, wherein the first limit of positional tolerance is lesser than the second limit of positional tolerance.

14. A flange of an exhaust diffuser, wherein the flange is remanufactured using the method of claim 9.

15. A gas turbine engine employing the exhaust diffuser of claim 14.

16. A remanufactured machine component for attachment to an adjacent component, the machine component comprising:
   a flange configured to be coupled by a plurality of fasteners to the adjacent component in a machine assembly;
   a first set of holes bored into the flange with a first enlarged diameter to define first openings in axial alignment with a first portion of corresponding holes of the adjacent component for co-axially receiving the fasteners;

a second set of holes bored into the flange, the second set of holes having a second enlarged diameter; and a plurality of inserts disposed within the second set of holes, wherein the inserts define second openings in axial alignment with a second portion of the corresponding holes of the adjacent component for co-axially receiving the fasteners therethrough, wherein the first set of holes are located within a first limit of positional tolerance with respect to the first portion of the corresponding holes of the adjacent component, and wherein the second set of holes are located outside the first limit of positional tolerance with respect to the second portion of the corresponding holes of the adjacent component.

17. The remanufactured machine component of claim 16, wherein the first set of holes are positioned in axial alignment with corresponding holes of the adjacent component.

\* \* \* \* \*